United States Patent [19]

Knitl

[11] Patent Number: 5,195,128
[45] Date of Patent: Mar. 16, 1993

[54] COMMUNICATION SYSTEM, PARTICULARLY A TELEPHONE COMMUNICATION SYSTEM

[75] Inventor: Reinhard Knitl, Munich, Fed. Rep. of Germany

[73] Assignee: Siemens Aktiengesellschaft, Munich, Fed. Rep. of Germany

[21] Appl. No.: 802,829

[22] Filed: Dec. 6, 1991

[30] Foreign Application Priority Data

Dec. 12, 1990 [DE] Fed. Rep. of Germany ....... 4041273

[51] Int. Cl.$^5$ .......................................... H04M 3/50
[52] U.S. Cl. ..................................... 379/67; 379/88; 379/89
[58] Field of Search .............................. 379/67, 88, 89

[56] References Cited

U.S. PATENT DOCUMENTS

| 4,585,906 | 4/1986 | Matthews et al. |        |
|-----------|--------|-----------------|--------|
| 4,602,129 | 7/1986 | Matthews et al. | 379/89 |
| 4,747,126 | 5/1988 | Hood et al.     |        |
| 4,791,660 | 12/1988| Oye et al.      | 379/88 |
| 4,932,048 | 6/1990 | Kenmochi et al. | 379/87 |
| 4,979,171 | 12/1990| Ashley          | 379/88 |

FOREIGN PATENT DOCUMENTS 0193764 2/1986 European Pat. Off. .
0304653 3/1989 European Pat. Off. .
0319282 6/1989 European Pat. Off. .

OTHER PUBLICATIONS

"Audio Messaging Inerchange Specification (AMIS)", Analog Protocol Version 1, Feb. 1, 1990, pp. 1-31. (Also Appendix A&B).

Primary Examiner—James L. Dwyer
Assistant Examiner—Fan Tsang
Attorney, Agent, or Firm—Hill, Steadman & Simpson

[57] ABSTRACT

Communication system, particularly a telephone communication system. The communication system has a controller (CC, CVSM) and a first central memory (SP, RAM) that accepts messages, particularly voice messages. Instead of a separate tone means that forms user prompting/alerting tone signals and/or control information signals for message exchange protocols, the first central memory (SP, RAM) forms the tone means and contains stored alerting tone signals and/or control information signals for message exchange protocols.

11 Claims, 2 Drawing Sheets

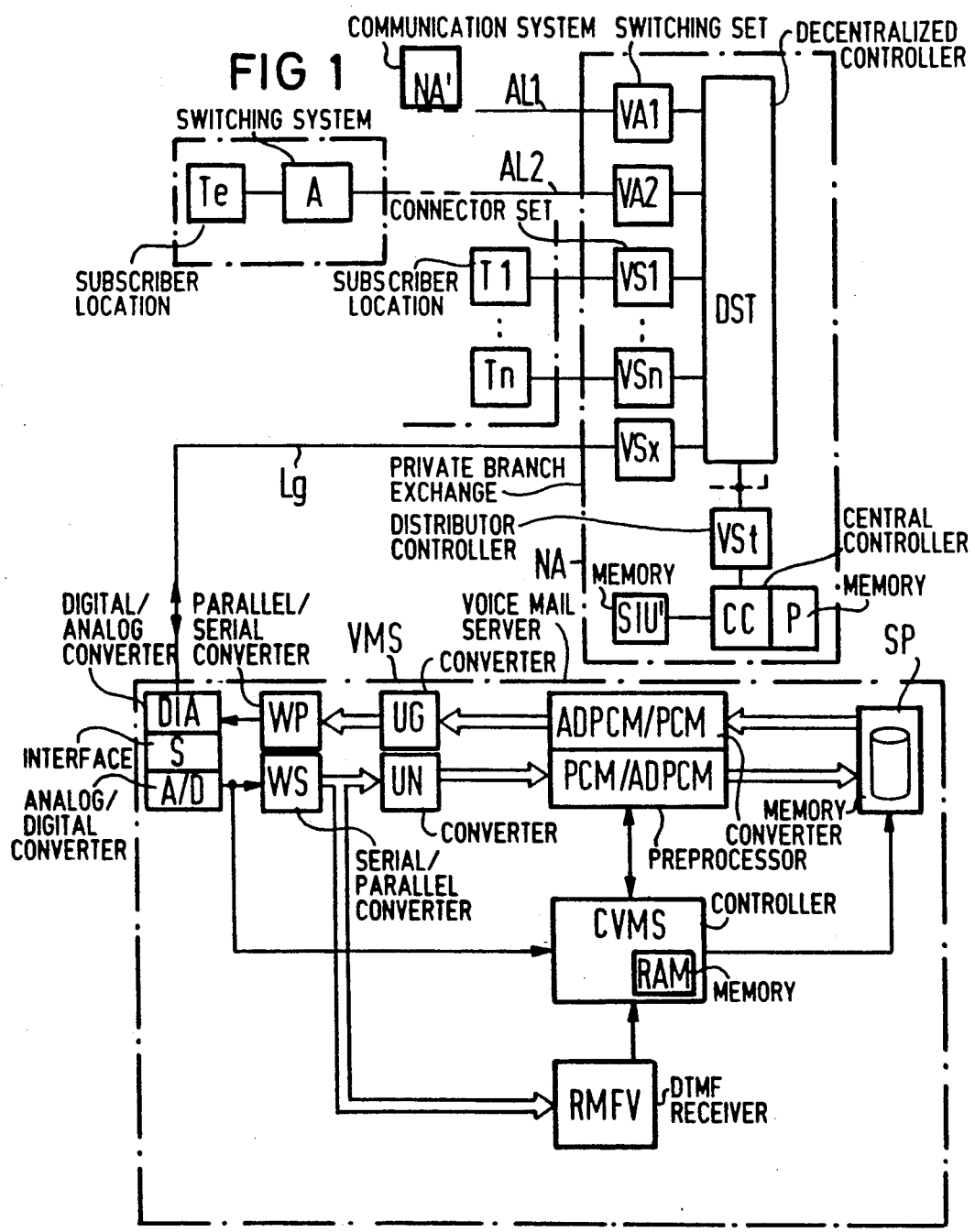

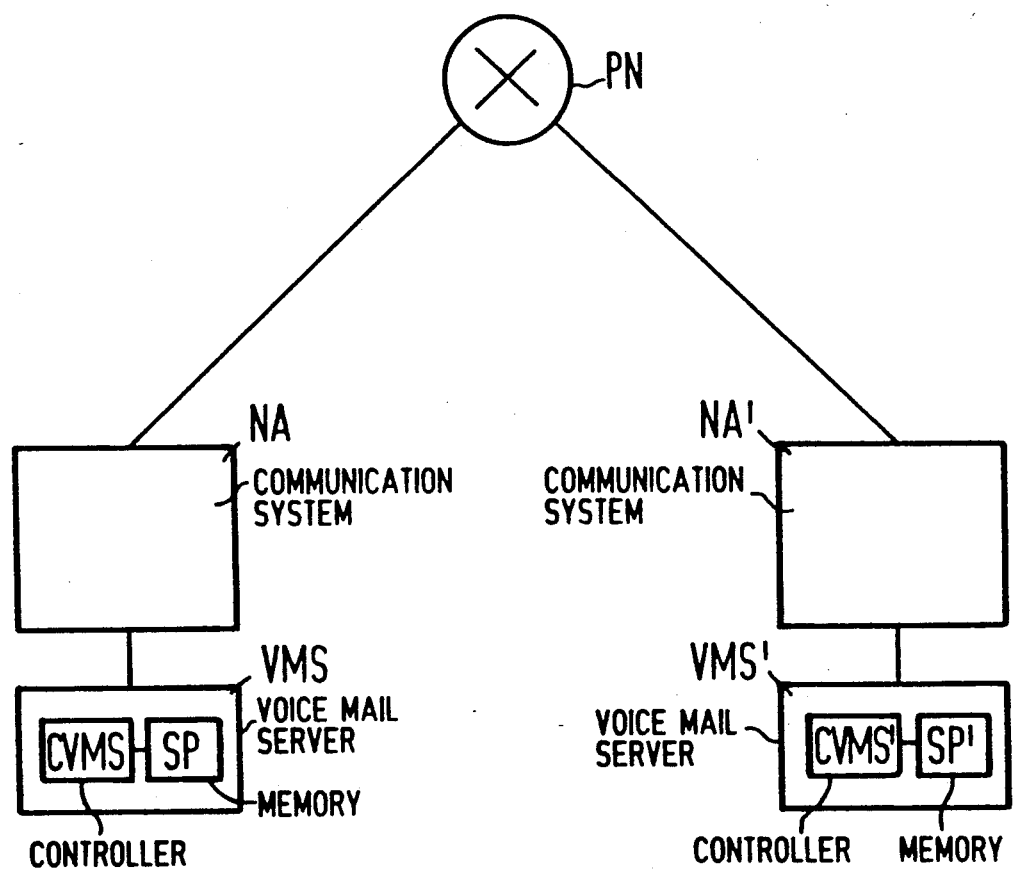

COMMUNICATION SYSTEM, PARTICULARLY A TELEPHONE COMMUNICATION SYSTEM

BACKGROUND OF THE INVENTION

Modern computer-controlled telephone communication systems provide a multitude of new possibilities in the use of the telephone. Included among these, for example, is the deferred communication of voice messages that can be deposited in a defined memory area of a central memory arrangement that is permanently assigned to a subscriber. The voice storing and the managed communication of the individual information can be realized both in a public telephone network as well as in private branch exchange systems. A subscriber to whom a memory area of a central memory arrangement is allocated can call in the voice messages deposited for him at a time he can freely select. In addition to recording the individual messages by a sender and the call-in by the authorized receiver, it is possible to edit the messages. Thus, for example, the sender can alter or erase the message when inputting the messages into the predetermined memory area of the central memory arrangement. The receiver likewise has various possibilities available to him regarding the messages deposited for him. Thus, he can call messages deposited for him in different parts or a number of times, can select specific messages, can combine them with his own message and can erase the originally deposited message at a freely selectable time. For user prompting in dialogue between a user of the system and the system, optical information displayable on terminal equipment, instructions in spoken form (referred to as prompts) and alerting tones can be provided.

For example, such a communication system is disclosed by German Published Application DE 35 07 343 and by U.S. Pat. No. 4,585,906. The communication system disclosed by the latter patent has a tone generator ("1152", column 42, lines 43-61, FIG. 25b) that serves the purpose of generating alerting tones, referred to as DTMF (dual tone multi-frequency) sound signals that are each composed of two frequencies.

German Published Application 31 34 328 discloses a method for operating a PCM system as well as for operating of a memory that stores PCM signals. Special digits are provided, that represent arbitrary information such as, for example, markings, that can be input by a terminal user and which can be routed to a user as needed by themselves.

SUMMARY OF THE INVENTION

It is an object of the present invention to provide a communication system of the type initially cited that has a simplified circuit-oriented structure for generating alerting tones and call progress tones as well as control information signals for message exchange protocols. Independent tone generator equipment usually provided in communication systems are superfluous.

The communication system of the present invention provides the operator with a simple means of inputting various tones into the system. These tones are input into the system just like the input of voice communications. The operator can therefore freely select the tones with respect to frequency, duration and tone alternation, and can also modify the tones as needed. Within the system, the stored tones are treated as voice communications so that only one set of control procedures is necessary for the tones and for the voice communications.

According to another advantageous embodiment of the invention, messages (useful data such as voice messages and/or fax messages) are stored in compressed form in a first central memory, whereas alerting sound signals and/or control information signals for data exchange protocols are stored in non-compressed form. Memory capacity is thereby saved by the compressing, in view of the usually great quantities of useful data, whereas an optimum reproduction quality is achieved by the non-compressing of the sound signals. Foregoing a compressing of the control signal information for message exchange protocols (DTMF signals) prevents a corresponding information loss and enhances the probability of a correct initiation of the procedures effected by the control information signals.

According to another advantageous embodiment of the present invention, it is provided that the control of the communication system has a second central memory allocated to it, which forms an audio tone means. Signals representing the audio tones (internal calling tones, busy signals, special tones, special call tones) are deposited therein. An independent audio tone generator means is also superfluous in this embodiment of the present invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGURES in which like reference numerals identify like elements, and in which:

FIG. 1 is a block diagram of a communication system of the present invention; and FIG. 2 is a diagram depicting the networking of two communication systems of FIG. 1 that exchange messages.

DESCRIPTION OF THE PREFERRED EMBODIMENT

The private branch exchange NA schematically shown in FIG. 1 in the form of a block circuit diagram is, for example, a computer-controlled and memory programmed switching system. The central controller means CC essentially controls the executions required for the individual operating possibilities of the system. It thereby accesses corresponding program parts that are deposited in the memory means P allocated to it. The private branch exchange NA also has a distributor controller VSt and a decentralized controller DST to which a defined plurality of equipment such as, for example, subscriber locations T1 . . . Tn are allocated. Insofar as the private branch exchange NA is fashioned as a digital switching system, the decentralized sub-controller DST is functionally a computer-controlled memory area to which digital voice signals are written and are read out to the respective party participating in the call. It thus represents the digital switching network. The unit VSt is a distribution and adaptation controller that services a plurality of decentralized sub-controllers DST to which respective connector sets are coupled. For example, the connection of the subscriber locations T1 . . . Tn thus occurs via the connector sets VS1 . . . VSn. The private branch exchange NA is connected to a further communication system NA' or to some other external system, for example to the switching system A of the public network via exchange line groups or, respectively, via exchange lines AL1 and AL2. The subscriber location Te is the terminal equipment connected to the switching system A. Switching sets VA1 and VA2 are allocated to the continuing lines AL1, AL2 or, respectively, to continuing line groups. The communication system NA can also be connected to the communication system NA' via what is referred to as a tie line. The switching sets VA1, VA2, VS1 ... VSn, VSx shown overall in the private branch exchange can be fashioned as active sets that contain a processor. This can pre-process information that, for example, are supplied by the alarm indication points contained in a subscriber circuit. For example, it can be provided that analog terminal equipment in addition to the digital terminal equipment provided in the standard case are connected via correspondingly fashioned connector sets. Connections that are based on analog voice information can thus be switched both via exchange lines as well as via subscriber or central office lines.

It is provided in the private branch exchange NA shown in FIG. 1 that voice information communicated in digital form as well as voice information that are communicated as analog voice information are processed in a voice mail server VMS connected to the system NA via a corresponding connector set VSx. Voice messages respectively intended for a specific subscriber or for a group of subscribers are deposited in a first central memory means SP or, respectively, in a main memory RAM allocated to the controller CVMS of the voice mail server VMS. This subscriber or these subscribers then have the possibility of designationally interrogating the messages.

Various operating functions are available to the respective subscriber both when producing a message as well as when listening to it. Included among these, for example, are start/stop of the input or, respectively, output, repetition of the message, fast forward/rewind, erasing and modifying a message.

Such a voice message can also be supplemented by further information such as, for example, the identify of the sender, the time of transmission, etc. When messages for a subscriber are deposited in the memory SP or, respectively, RAM, then he can be appropriately signaled. The existing telephone set T1 ... Tn, Te can be employed as terminal equipment for this inherently known deferred type of communication that occurs on the basis of the central memory means SP or, respectively, RAM. The subscriber signals, as shall yet be set forth, by actuating function keys. In the opposite direction, the subscriber can receive spoken instructions (prompts) taken from the first central memory SP or, respectively, RAM.

For making use of the individual functions of the voice mail server VMS, the subscriber who stores a voice message for another subscriber selects specific numbers or number combination or, respectively, actuates function keys. As a result of this control information generated in accord with the respective key actuation, the respectively allocated functional sequence is then initiated. This is defined by a corresponding operating program for the controller CVMS allocated to the voice mail server VMS.

The incoming voice information can be pre-processed in such fashion that the voice information is a PCM coded signal that sequences via the line connection Lg and are forwarded via the interface S. Alternatively, it can be provided that analog signals transmitted via the line connection Lg are digitized in the voice mail server VMS. The analog-to-digital conversion occurs with the unit A/D. The unit WS following the interface S converts serial signals into parallel signals. The connection to the following units UN, ADPCM/PCM and SP occurs via line arrangements that are composed of a plurality of individual lines corresponding in number to the plurality of bits. Such line arrangements are shown in FIG. 1 with connecting lines parallel to one another. For the further-processing, the digital information made available by the unit WS that are originally formed on the basis of a non-linear, generally logarithm characteristic on which the quantization is based are converted by the unit UN into information derived on the basis of a linear characteristic. The incoming information are pre-processed in the following unit PCM/ADPCM in order to reduce the memory outlay that is necessary for the intended storing in the unit SP or, respectively, RAM. For example, one possibility of this pre-processing is comprised in converting the PCM signals into what are referred to as ADPCM signals. This pre-processing method with which the digitized voice or, respectively, audio signals are compressed is referred to as adaptive difference PCM method. This inherently known pre-processing occurs dependent on control information that are output by the control unit CVMS. The control unit CVMS controls the executions of the means VMS on the basis of a corresponding operating program. The control CVMS also controls the events in conjunction with the write-in and read-out of the voice messages into and out of the memory means SP or, respectively, RAM. The unit CVMS also controls the storing of information that accompany voice messages, such as, for example, information that indicate the identity of the subscriber transmitting the message or the time of transmission.

An informational flow wherein control information are contained in addition to the voice information can be available as input information for the voice processing and memory system VMS. These control information are composed of DTMF characters that have been formed by an analog subscriber terminal equipment. In an ISDN (integrated services digital network) communication system, by contrast, the control information are composed of bit sequences that represent logical protocol elements and that, in this system, are communicated in the D-channel to the controller CVMS that has a corresponding D-channel connection via the interface S to the switching computer CC. With this control information, a subscriber of the communication system can effect the selection of the equipment VMS when producing the voice communication and can process this voice information in various ways, for example edit it (start/stop, repeat, reproduce, etc.). To this end, control information (particularly DTMF characters) are also deposited between the voice information given subscriber terminal equipment constructed in analog technology. The control unit CVMS connected to the interface S identifies the arriving information either as voice information or as control information. When the control unit CVMS recognizes a control information, then it suppresses the storing thereof into the memory unit SP or, respectively, RAM during the time wherein such a control information appears. The corresponding procedures are known from European Patent Publication No. 0 193 764.

As already mentioned, for example, the control information are communicated as DTMF (dual tone multi-frequency) characters from the terminal equipment T1... Tn, Te insofar as these are constructed in analog technology and are received by a DTMF receiver RMFV in the voice mail server and connected to the control unit CVMS.

Given read-out of the message from the memory SP or, respectively, RAM, control information are also initially communicated from the subscribers authorized for this. These are DTMF characters insofar as the voice messages are called in by a terminal equipment constructed in analog technology. On the basis of selected codes, for example, the appertaining subscriber can identify himself vis-a-vis the voice mail server VMS as authorized or he can signal the request for a repetition of a message output. These control information are likewise recognized and evaluated by the unit RMFV. The unit RMFV forms an information identifying the evaluation result and communicates this to the control unit CVMS. The control unit CVMS also controls the unit ADPCM/PCM that reconverts the voice information stored in the memory means SP or, respectively, RAM according to the adaptive difference PCM method into PCM-coded information. The unit UG converts the digital information formed on the basis of a linear characteristic into information which are again based on a logarithmic characteristic. The unit WP converts the digital information present in parallel form into serial, digital information. Following thereupon, a digital-to-analog conversion by the unit D/A may occur. The voice messages read out from the memory unit SP or, respectively, RAM are thus available at the interface S, these voice messages being communicated via the private branch exchange NA to, for example, the subscriber location Te of the switching system A or to another communication system NA'.

The following functions that can be initiated by selecting the numerals or, respectively, characters that are likewise recited below are, for example, available to the operator during write-in and read-out of voice messages into or, respectively, out of the voice mail server: "1, begin/end message record", "3, beginning/end message playback", "4, 10 seconds rewind", "44, rewind to start", "6, 10 seconds fast forward", "66, fast forward to end", "#, erase message", "*, seeking stored message in infobox or terminate input (address, code number)/end function" and "0 *, abort function and return to function selection". The user prompting thereby occurs on the basis of voice statements (prompts) and/or on the basis of what are referred to as positive or negative alerting or acknowledgment tones. A positive alerting tone or acknowledgement tone is composed, for example, of a one-time continuous tone lasting 3.5 seconds and having a frequency of 425 Hz (beep), whereas a negative acknowledgement tone or refusal tone is formed by a busy signal that is 3.5 seconds long (frequency of 425 Hz: pulse duration/pulse separation=170 ms/430 ms) or by three beeps.

Whereas the positive and negative user prompting-/alerting tones in the prior art are formed by an independent hardware unit (a tone generator means), a communication system of the present invention does not have such a hardware unit. On the contrary, the alerting tones are stored, particularly in digital form, under predetermined addresses in the memory unit SP or in some other memory, particularly in the main memory RAM allocated to the control unit CVMS. When a positive or, respectively, a negative alerting tone is to be communicated to a terminal equipment T1... Tn, Te, the controller CVMS, instead of driving the tone generator that is not provided, inventively selects the addressed memory location in the memory means SP or, respectively, RAM wherein the respective alerting signals are stored, calls these in from the memory SP or, respectively, RAM and communicates them to the respective terminal equipment, an internal terminal equipment T1... Tn or an external terminal equipment Te.

The alerting tone signals can be stored in compressed form. For example, the alerting tones are input in analog form via an internal terminal equipment T1... Tn and are supplied via the private branch exchange NA to the memory unit SP in the voice mail server VMS and are stored there. The alerting tones are handled, in this case, just like voice messages to be stored and pass through the units S, WS, UN and PCM/ADPCM before they are written into the memory unit SP and, potentially, are transmitted into the main memory RAM.

When, on the basis of a user input by selecting a numeral or, respectively, a special character, the operator is to be supplied with a positive or with a negative alerting tone at an internal or external terminal equipment, the control unit CVMS calls the corresponding signals in from the memory unit SP or, respectively, RAM, these being stored therein in digital, compressed form. The called-in information, just like the called-in voice messages, pass through the units ADPCM/PCM, UG, WP and S and proceed via the line connection LG to the respective subscriber terminal equipment.

For accessing the alerting tone signals stored in the memory unit SP or, respectively, RAM under predetermined addresses, the control unit CVMS accesses a corresponding table (not shown in FIG. 1) wherein the allocation between memory location address and alerting tone signals is stored.

Differing from the useful data, however, the alerting tone signals can also be stored in non-compressed form in the memory SP or, respectively, RAM. In this case, the control unit CVMS switches the unit PCM/ADPCM off upon initial input (recording) and the control unit CVMS switches the unit ADPCM/PCM off at every output. The non-compressed storing of the alerting tone signals improves the reproduction quality of the alerting tones compared to the reproduction quality given the compressed storing. "Non-compressed" in this context means that a plurality of samples per time unit, for example 64 Kbit/sec, is formed according to the sampling theorem for alerting tone signals (and for the control information signals for message exchange protocol to be set forth later). Given compression of the voice messages, by contrast, a smaller plurality of samples per time unit, for example 32 Kbit/sec, is formed, for example according to the ADPCM method.

The digital alerting signal values, however, can be produced in some other way and be introduced into the predetermined memory areas (SP, RAM). Proceeding on the basis of digital alerting tone signals that are already present and that are generated in the above-described way, the manufacturer takes the existing digital alerting tone signals and copies these into the provided memories SP or, respectively, RAM before or upon initialization of a voice mail server VMS. Alternatively thereto, the digital alerting tone signals to be transferred can also be synthetically produced in a manner intrinsically known from the field of synthetically generated music, whereby the digital alerting tone signals to be formed here are to be formed in PCM coding in a way conforming to the system.

FIG. 2 shows two communication systems NA, NA' that, for example, can be connected to one another via the public telephone network. Each communication system has a voice mail server VMS or, respectively, VMS' that each contain a controller CVMS or, respectively, CVMS' and a central memory SP or, respectively, SP'. Instead of the voice mail servers VMS, VMS', other message storing systems, for example storage systems for accepting fax messages, can also be provided. These other message storing systems are fundamentally constructed like the voice mail servers VMS, VMS' but without the voice-associated units WS, UN, PCM/ADPCM, ADPCM/PCM, UGNDP. It is assumed in the following that useful data are exchanged between the communication systems NA, NA'.

Instead of the above-described alerting tones that serve the purpose of user prompting, DTMF characters can be stored in the memory unit SP or, respectively, RAM of the voice mail server VMS or of some other message storing system in addition thereto or alternatively thereto. These DTMF characters, however, do not serve the purpose of user prompting but represent control information signals for message exchange protocols that serve the purpose of communicating voice information or other messages (for example, fax) that are stored in a memory means SP of a first communication system NA to a memory unit SP' of a second communication system NA' that is networked with the first communication system NA.

Such a communication of voice information from a memory means SP of a first communication system NA to a memory unit SP' of a second communication system NA', potentially via the public network PN, is known. The voice information units SP, SP'—in conjunction with computer-controlled communication systems NA, NA'—are currently connected to one another via analog networks for the purpose of message information exchange and shall be connected to one another in the future via digital networks. The sequencing of such a message information exchange occurs with declared message exchange protocols. Such a message exchange protocol is defined by "Audio Messaging Interchange Specification (AMIS), Analog Protocol, Version 1, February 1990, Dec. 15, 1989 final draft". For example, what are referred to as DTMF (dual tone multi-frequency) audio signals are thereby provided with which, for example, sessions are opened and ended, acknowledgements are provided and/or sender addresses are exchanged. Instead of a hardware means that is usually provided and that generates the acquired DTMF audio signals, these audio signals that represent control information signals for messaging protocols are stored in the memory means SP or, respectively, in the memory RAM of the voice mail server in the communication system of the present invention and, as set forth above in conjunction with the alerting tones, are handled like messages that are to be stored or, respectively, called in. When generating these DTMF audio signals, these are first input in analog form into, for example, an internal terminal equipment Tn or are synthetically generated in the manner set forth above in conjunction with alerting tones. In the former instance, the recited audio signals pass through the units S, WS, UN and PCM/ADPCM on their way to the memory means SP. After the call-in of the audio signals, these pass through the units ADPCM/PCM, UG, WP and S. The corresponding operations are controlled by the control units CVMS in the above-described way. The unit RMFV recognizes the incoming DTMF audio signals which represent control information signals for message exchange protocols, evaluate these and communicate information indicating the results of the evaluation to the control unit CVMS.

The operating program of the control unit CVMS, for example, is configured in accord with the rules contained in the afore-mentioned, U.S. specification AMIS and sequences the entire dialogue with the control unit CVMS' of the corresponding communication system NA'.

Such a dialogue between two communication systems NA,NA' having central memories SP, SP' that serve the purpose of accepting voice information or other message information (fax, text) is initiated, for example, by an intrinsically known multi-address job that is input into a first communication system NA. To this end, the appertaining control unit CVMS accesses an address register wherein the allocation between the information recited in the multi-address job (call numbers of the B-subscriber) and the call number of the memory system (communication system NA') is contained. After the connection between the two systems NA, NA' is set up, the control unit CVMS of the system NA calls the stored DTMF control information signals for message exchange protocols from the memory SP for the sequencing of the protocol (voice coordination dialogue) and communicates this to the control unit CVMS' of the corresponding system NA'.

It is also provided in the present invention that the controller CC (FIG. 1) of the communication system NA has a second central memory SIU' allocated to it instead of a generator, this second central memory SIU' forming an audio tone means. Signals representing audio tones are stored, particularly in PCM-coded form, in this second central memory SIU'. These audio tones include, among other things, internal calling tones, busy signals, special tones and special call tones.

These audio tone signals are inventively generated, stored, administered and called in like the alerting tone signals and like the control information signals for message exchange protocols. The audio tones are output by the central controller CC of the communication system NA for output to the corresponding connector set VA1, VA2, VSl, ... VSn, VSx in accord with the respective switching-oriented status.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system having at least one controller with at least one first central memory for storing communicated messages, the communication system also having at least one of internal terminal equipment, of at least one connection to external terminal equipment and of at least one connection to central equipment of another communication system, comprising: tone means that forms at least one of user prompting/alerting tone signals and control information signals for message exchange protocols that the controller calls in from the tone means for transmission to the at least one of the internal terminal equipment of the communication system, the external terminal equipment and the central equipment of another communication system, the tone means being formed in the at least one first central memory that stores at least one of the alerting tone signals and control information signals for message exchange protocols, the tone signals and control information signals being stored in the first central memory along with the messages and being called in by the controller in the same manner as the messages are called in by the controller.

2. The communication system according to claim 1, wherein the messages stored in the at least one first central memory are stored in compressed form and wherein the at least one of the alerting tone signals and control information signals for message exchange protocols stored in the at least one first central memory are stored in non-compressed form.

3. The communication system according to claim 1, wherein the at least one controller of the communication system has a second central memory allocated to it that forms an audio tone means and in which signals representing audio tones are stored.

4. The communication system according to claim 1, wherein the audio tones include at least one of calling tones, busy signals, special tones and special call tones.

5. The communication system according to claim 1, wherein the messages are voice messages and the communication system is a telephone communication system.

6. A telephone communication system comprising at least a first controller with a first central memory for storing communicated voice messages, the communication system having at least one of internal terminal equipment, of at least one connection to external terminal equipment and of at least one connection to central equipment of another communication system; a tone means that forms at least one of user prompting/alerting tone signals and control information signals for message exchange protocols that the first controller calls in from the tone means for transmission to the at least one of the internal terminal equipment of the communication system, the external terminal equipment and the central equipment of another communication system, the tone means being formed in the first central memory that stores at least one of the alerting tone signals and control information signals for message exchange protocol, which are stored in the first central memory in the same manner as the voice messages and which are called in by the first controller in the same manner as the voice messages are called in by the first controller.

7. The communication system according to claim 6, wherein the messages stored in the first central memory are stored in compressed form and wherein the at least one of the alerting tone signals and control information signals for message exchange protocols stored in the first central memory are stored in non-compressed form.

8. The communication system according to claim 6, wherein the communication system has a second controller with a second central memory, the second central memory being an audio tone means in which signals representing audio tones are stored.

9. The communication system according to claim 8, wherein the audio tones include at least one of internal calling tones, busy signals, special tones and special call tones.

10. A telephone communication system comprising: a first controller with a first central memory for storing communicated voice messages, the communication system having at least one of internal terminal equipment, of at least one connection to external terminal equipment and of at least one connection to central equipment of another communication system; a tone means that forms at least one of user prompting/alerting tone signals and control information signals for message exchange protocols that the first controller calls in from the tone means for transmission to the at least one of the internal terminal equipment of the communication system, the external terminal equipment and the central equipment of another communication system, the tone means being formed in the first central memory that stores at least one of the alerting tone signals and control information signals for message exchange protocols, the tone signals and control information signals being stored in the first central memory along with the messages and being called in by the controller in the same manner as the messages are called in by the controller; the messages stored in the first central memory being stored in compressed form and the at least one of the alerting tone signals and control information signals for message exchange protocols stored in the first central memory being stored in non-compressed form; and a second controller with a second central memory, the second control memory being an audio tone means in which signals representing audio tones are stored.

11. The communication system according to claim 10, wherein the audio tones include at least one of internal calling tones, busy signals, special tones and special call tones.

* * * * *